Nov. 17, 1970 G. J. AGIN ET AL 3,541,418

PROPORTIONAL DAMPING FOR MOTOR DRIVE

Filed Sept. 5, 1967

*INVENTORS.*
GERALD J. AGIN
GEORGE MELNYK

BY Francis V. Giolma
*ATTORNEY*

3,541,418
PROPORTIONAL DAMPING FOR MOTOR DRIVE

Gerald J. Agin, Owego, and George Melnyk, Endicott, N.Y., assignors to International Business Machines Corporation, Armonk, N.Y., a corporation of New York Filed Sept. 5, 1967, Ser. No. 665,539
Int. Cl. G05b *1/00*
U.S. Cl. 318—612 6 Claims

ABSTRACT OF THE DISCLOSURE

A position control circuit for a motor having forward and reverse accelerating circuits which are energized by error signals to provide corrective positioning, is provided with proportional single shots connected to provide an additional corrective pulse of opposite polarity at the termination of an error signal and of a duration proportional to the duration of the error signal.

FIELD OF THE INVENTION

The invention relates generally to the correction of small position errors of direct current motors such as printed circuit servo motors after incrementing and while nominally stopped.

DESCRIPTION OF THE PRIOR ART

Positioning of printed circuit motors when stopped has been effected by using a pair of solar cells and a slotted feedback disk so arranged that when a reveres position error exists, both cells are dark, and when a forward position error exists, they are both light. The outputs of the cells and their inversions are ANDed to provide forward and reverse corrective signals for application to the motor drive circuits when reverse and forward position errors exist.

SUMMARY OF THE INVENTION

This invention relates to motor control circuits and it has reference in particular to a digital damping circuit for printed circuit motors.

Generally stated, it is an object of this invention to provide an improved position control circuit for printed circuit motors.

More specifically, it is an object of this invention to reduce hunting of a printed circuit motor by an improved position control circuit.

Another object of the invention is to provide proportional single shot damping for digital displacement servo motors.

Yet another object of the invention is to provide for applying a hunt control pulse to a motor at the termination of a position error correction signal.

Still another object of the invention is to provide for using a proportional single shot in a motor control system for applying an anti-hunt signal to a motor drive circuit at the termination of a position error correction signal, which is proportional to the error correction signal.

Another important object of the invention is to provide in a motor position control system a hunt control pulse which is opposite to as well as proportional to the duration of a position error correction signal.

Yet another important object of the invention is to provide in a digital servo motor system for using a proportional single shot for providing an anti-hunt pulse at the termination of a position error correction signal, which is opposite in polarity to, and proportional to the duration of, the terminated error correction signal.

In accordance with a preferred embodiment of the invention, a D-C motor is positioned by signals from two photo cells which are so located in relation to a slotted emitter disk driven by the motor, that in a normal position, one cell is dark and one is light; when there is a forward error, both cells are light; and when there is a reverse position error, both cells are dark. The signals and their inversions are ANDed to produce position error correction signals for the motor drive circuit to correct the position error. Proportional single shots are connected to the forward and reverse error AND's for applying to the drive circuit at the termination of each correction signal, pulses which are proportional to the duration of and opposite in the sense to the correction signals, for rapid damping of oscillations and more accurate and faster positioning.

The foregoing and other objects, features and advantages of the invention will be apparent from the following more particular description of a preferred embodiment of the invention as illustrated in the accompanying drawings.

In the drawings:

FIGS. 1*a*–1*c* show typical photo cell and emitter disk conditions in a typical position error control system;

DESCRIPTION OF A PREFERRED EMBODIMENT

Figure 1A:
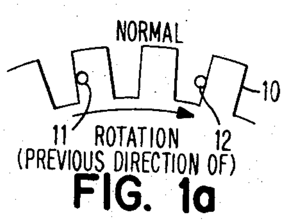
Figure 1B:
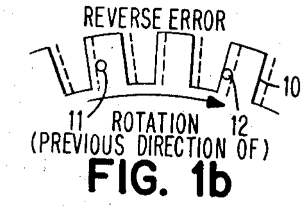
Figure 1C:
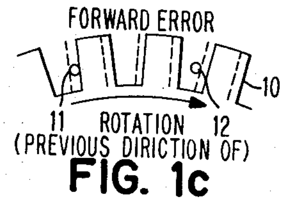

FIGS. 1*a*, 1*b*, and 1*c* show the position of an emitter disk 10 on the shaft of a servo motor which is to be accurately positioned, with respect to a pair of sensing photo cells 11 and 12 for different at rest position conditions. In FIG. 1*a* the normal and desired condition is shown with the cell 11 covered by a tooth of the emitter 10 while the cell 12 is exposed. The teeth of the emitter 10 are spaced in accordance with the minimum desired servo motor increment.

FIG. 1*b* shows a reverse error condition which might have pre-existed at the time the system is first enabled by the detent enable signal, shown in which both of the cells 11 and 21 are covered by teeth of the emitter 10 and in FIG. 1*c*, a forward error condition is shown in which both of the photo cells 11 and 12 are exposed, being both in the light conditions.

Figures 2, 3, 4:
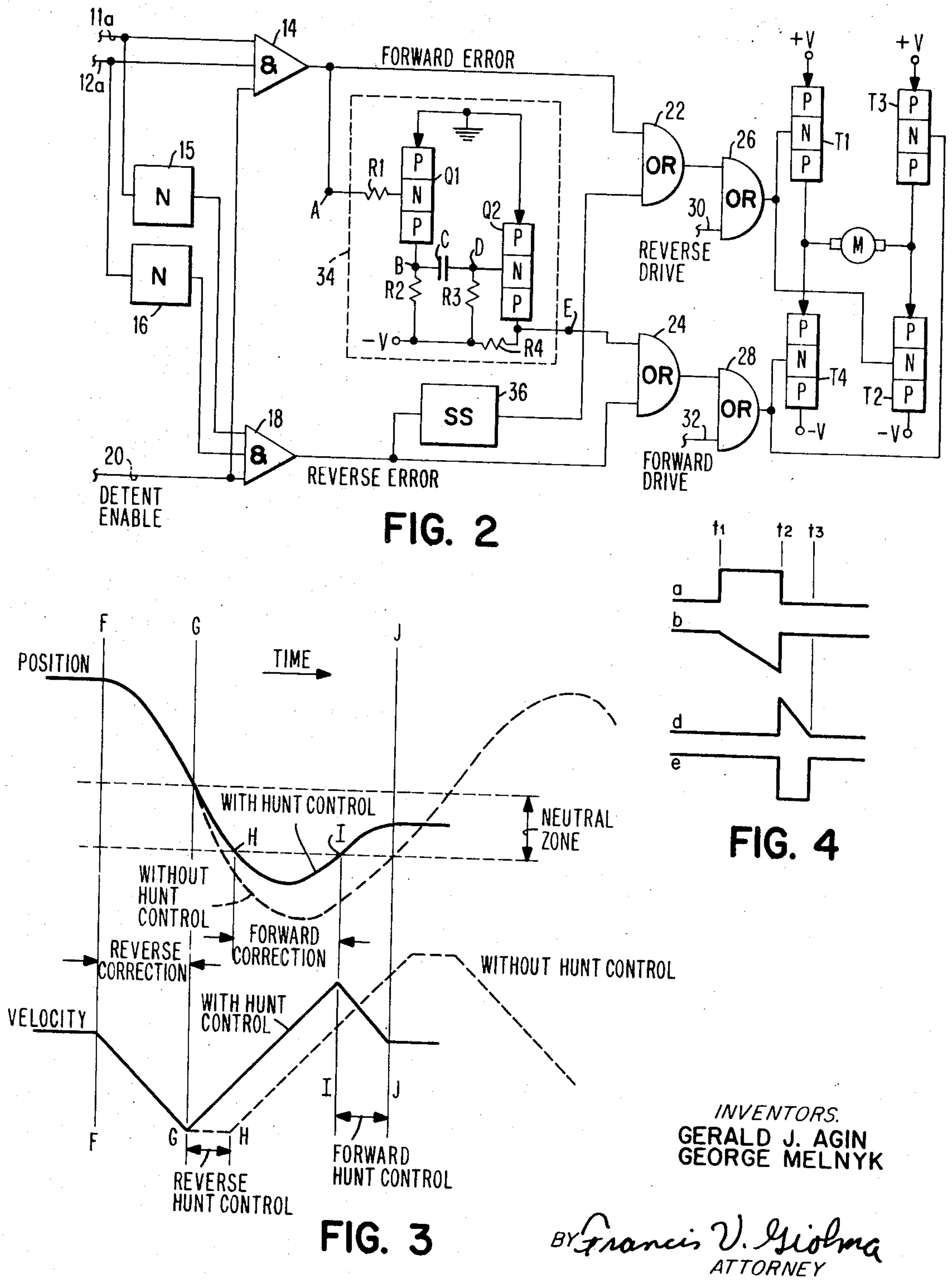
FIG. 2 is a schematic diagram of a motor position control system embodying the invention in one of its forms.
FIG. 3 shows curves illustrating the position and velocity conditions of the motor after a stopping operation with a resultant position error.
FIG. 4 shows curves illustrating voltage conditions at different points in the circuit of FIG. 2.

It will be seen from FIG. 2 that the outputs from the photo cells 11 and 12 and their associated light sources are connected by means of conductors **11*a* and 12*a* respectively to an AND 14 and through inverters 15 and 16 to an AND 18. These inputs are gated by means of a Detent Enable signal, which occurs only after the servo motor has stopped, over conductor 20 to provide position correction forward and reverse error signals from the AND's 14 and 18 for correcting the motor position whenever the motor is stopped but not in the normal position. The outputs of the AND's 14 and 18 are applied through OR's 22 and 24 to the armature of a motor M through drive circuits represented by the transistors T1 and T2 and T3 and T4 respectively. OR's 26 and 28 are provided for energizing the reverse and forward drive circuits of the motor M, either from the OR's 22 and 24 or from other reverse and forward drive circuits over conductors 30 and 32 respectively. Proportional single shots 34 and 36, each controlled by an error signal from its associated AND 14 or 18, measure the length of time the correction is applied, and then on termination of the error signal, apply a pulse to the respective drive circuit through OR 24 or OR 22, which is proportional to the length of the correction which has just terminated. Since the output of AND 14 is normally applied to the input of OR 22, while termination of a pulse at AND 14 applies a pulse through proportional single shot 34 to OR 24, and since OR's 22 and 24 operate to accelerate the motor in opposite directions, the effect of the pulse from proportional single shot 34 will be of opposite polarity to the effect of the correction pulse just terminated. Similar reasoning applies to AND 18 and proportional single shot 36. The circuit of the single shot 34 is representative of a circuit which will perform the proportional single shot function. It comprises common emitter transistors Q1 and Q2 having a capacitor C connected between the collector of Q1 and the base of Q2. A resistor R1 connects the base of transistor Q1 to the AND 14, and a collector resistor R2 connects the transistor Q1 to a source of negative voltage. The collector of the transistor Q2 is connected through a resistor R4 to the source of negative voltage, and also provides an output at the terminal E to the OR circuit 24**. The input to the base of the transistor Q1 is designated A and the collector of Q1 is designated terminal B. A resistor R3 connects a point D intermediate the capacitor C and the base of the transistor Q2 to the negative voltage source.

When the circuit is in its relaxed state (before *t*1 in FIG. 4), point A is held at a negative voltage, allowing transistor Q1 to conduct, thus holding the point B slightly below ground potential. Base current from transistor Q2 is allowed to flow through resistor R3 causing transistor Q2 to conduct, and point E to be slightly below ground potential. At time *t*1, a pulse of positive voltage is applied at A, cutting off transistor Q1. Current will now flow through the base of transistor Q2, capacitor C, and resistor R2, charging the capacitor C with a time constant R2 C. At time *t*2, the input pulse is removed, causing transistor Q1 to conduct, thus raising the point B to slightly below ground potential. Because the voltage across the capacitor C cannot change instantaneously, the voltage at the point D jumps also, as shown by the curve *d* in FIG. 4, thus reverse biasing the base junction of transistor Q2 and bringing the point E to a negative voltage as shown by the curve *e*. A current through transistor Q1, capacitor C, and resistor R3 will discharge capacitor C with a time constant R3 C, until base current from transistor Q2 clamps the point D. The voltage at point E returns to just below ground potential and the circuit is once more in its relaxed state. The length of time the output of the circuit is at a negative potential depends on the length of time the input pulse was applied, and on the ratio of the time constant R3 C and R2 C. In one example R2 was 20K ohms, R3 was 5K ohms and C was between .001 and .01 microfarad.

FIG. 3 shows in solid lines shaft position and angular velocity relations for the same initial conditions as were used to obtain the curves shown in dotted outline, which were for the system of FIG. 2 without the hunt control comprising the proportional single shots 34 and 36. This example assumes a forward error existed at the time the system of FIG. 2 is first enabled by the detent enable signal. At the point F in the diagram of FIG. 3, the detent signal is applied, turning the detent on, and causing the correction logic to apply a reverse torque to the motor, bringing it into the neutral zone at the point G. The velocity at this time is relatively large and negative, and to reduce this velocity, a hunt control single shot fires at the point G. The hunt control correction cannot damp out oscillations in a single half-cycle if the initial displacement is large or if the emitter disk is at some position outside the neutral zone when correction is initially applied. However, when the disk moves out of the neutral zone at the point H in the diagram, its velocity has been reduced substantially. Forward correction is applied from time H to time I as determined by the sensing photo cell. Starting at the time I, the hunt control single shot fires for a period determined by the interval between H and I, and the ratio of the proportional single shot. The theoretical optimum ratio is 50%. At time J the motor is at or near zero velocity. Any small residual velocity will be damped out by friction or eliminated on an additional hunting cycle.

Thus when a detent enable signal is applied to the AND 14 or 18; the position of the emitter 10 relative to the photo cells 11 and 12 will determine whether a position error exists and whether it is forward or reverse. If a forward error condition exists, both photo cells will be exposed in the right condition and AND 14 will be activated, applying a forward error signal to OR 22 and through OR 26 to the reverse drive transistors T1 and T2 for effecting reverse movement of the armature of the motor M to correct the error condition. When AND 14 is activated, a voltage is applied to the proportional single shot 34 at the terminal A, cutting off the transistor Q1. Current will now flow through the base of transistor Q2 charging the capacitor C with a time constant R2 C. At the time *t*2 when the input pulse is removed at the end of the forward error signal from AND 14, transistor Q1 will conduct, raising the point B to slightly below ground potential. Because the voltage across the capacitor C cannot change instantaneously, the voltage at the point D jumps also, back biasing the base junction of transistor Q2 and bringing the point E to a negative voltage. The negative voltage applied to OR 24 activates T3 and T4, providing a forward correction damping torque. A current through transistor Q1, capacitor C, and resistor R3 will discharge capacitor C with a time constant, R3 C until base current from transistor Q2 clamp point D. The voltage at point E returns to just below ground potential, and the circuit is once more in its relaxed state removing the corrective damping signal from the OR 24. The length of time the output of the circuit is at a negative potential depends on the length of time the input pulse was applied from the AND 14, and on the ratio of the time constants R3 C and R2 C. In other words, the operation of this circuit may be restated by saying that the capacitor C is charged at one rate by the input signal from the AND 14 and is allowed to discharge at another rate, and changes its output state during the discharge of the capacitor C.

This invention may be applied to any reversible mechanical actuator which develops a force or torque in response to a forward or a reverse control signal; for instance, any D-C motor with a reversible on/off drive. Position sensing may be by any means of a nature for statically determining whether or not the actuator or shaft is beyond a reference position; for instance, photo cells, brushes, capacitance sensing, potentiometers, or the like. The circuit of the present invention applies a hunt control pulse to a motor which has been initially stopped slightly out of a desired position upon termination of a correction interval, which pulse is of opposite polarity to the original correction and the duration of which is proportional to the duration of the original correction. This provides for rapid damping of oscillations in an off/on positioning servo without external dampers or friction, thus allowing for more efficient operation during times when detenting is not desired and reducing mechanical cost.

While the invention has been particularly shown and described with reference to a preferred embodiment thereof, it will be understood by those skilled in the art that various changes in form and details may be made herein without departing from the spirit and scope of the invention.

What is claimed is:

1. In a position control circuit for a motor having an armature disposed to be selectively energized by forward and reverse drive circuits, and having motor position sensing means, forward and reverse gating means connected between said sensing means and said drive circuits activated by a detent enable signal which occurs after the motor has stopped to selectively apply forward and reverse error signals to said drive circuits to correct any deviation of the armature from a predetermined stopped position, and means including a single shot connecting said gating means and said drive circuits operable in response to termination of an error signal applied to one of said drive circuits to apply a timed pulse damping signal to the other of the drive circuits to effect portion correction opposite in sense to that of error signal.

2. A position control circuit substantially as described in claim 1 characterized by the single shot being a proportional single shot producing a pulse proportional to the error signal applied to it.

3. A position control circuit substantially as described in claim 2, characterized by a proportional single shot being connected to each error signal circuit and to the drive circuit of the other error signal circuit.

4. A position control circuit substantially as described in claim 3, characterized by the proportional single shot comprising a capacitor having semiconductor means operable in response to an error signal to provide a charging circuit for the capacitor while the error signal persists and operable when the error signal terminates to effect discharge of the capacitor and provide a timed signal proportional to the duration of the error signal.

5. A position control circuit substantially as described in claim 4, characterized by the proportional single shot comprising a capacitor means including a first transistor and a resistor connected to different terminals of the capacitor to provide a base current charging circuit for the capacitor, a second transistor connected to switch the resistor terminal of the capacitor from one voltage level to another and resistance means providing with the second transistor a discharge circuit for the capacitor connected to the first transistor terminal of the capacitor.

6. A position control circuit substantially as described in claim 5, characterized by the position sensing means comprising a slotted disk and light source means with a pair of peripherally spaced photo cells connected to an AND to produce forward error signals for application to the reverse drive circuit, and connected through inverter means to another AND to produce reverse error correction signals for application to the forward drive circuit, and a proportional single shot being connected from each AND to the drive circuit of the other AND.

References Cited

UNITED STATES PATENTS

| | | | |
|---|---|---|---|
| 3,306,416 | 2/1967 | Dahlin et al. | |
| 3,370,289 | 2/1968 | Hedgcock et al. | |
| 3,378,741 | 4/1968 | Sutton. | |
| 2,674,707 | 4/1954 | Demott. | |
| 2,780,760 | 2/1957 | Dion. | |
| 3,345,547 | 10/1967 | Dunne | 318—138 |
| 3,363,158 | 1/1968 | Potma. | |
| 3,423,658 | 1/1969 | Barrus | 318—138 |

GLEN R. SIMMONS, Primary Examiner

U.S. Cl. X.R.

318—685